United States Patent [19]

Massengeil et al.

[11] 4,173,411
[45] Nov. 6, 1979

[54] EXPOSURE SYSTEM FOR COPYING MACHINES

[75] Inventors: Hans A. Massengeil; Otto Stemme, both of Munich; Rudolf Eppe, Taufkirchen; Josef Pfeifer, Unterhaching; Georg Königl; Anton Schätz, both of Munich, all of Fed. Rep. of Germany

[73] Assignee: AGFA-Gevaert, A.G., Leverkusen, Fed. Rep. of Germany

[21] Appl. No.: 854,750

[22] Filed: Nov. 25, 1977

[30] Foreign Application Priority Data

Nov. 30, 1976 [DE] Fed. Rep. of Germany ....... 2654319

[51] Int. Cl.$^2$ ...................... G03B 27/48; G03B 27/50
[52] U.S. Cl. .......................................... 355/50; 355/8; 355/51
[58] Field of Search ...................... 355/3 R, 8, 11, 47, 355/50, 51, 66, 60, 46

[56] References Cited

U.S. PATENT DOCUMENTS

| | | | |
|---|---|---|---|
| 1,752,753 | 4/1930 | Owens | 355/51 X |
| 3,346,739 | 10/1967 | Jenkner | 355/60 X |
| 3,584,950 | 6/1971 | Gundlach | 355/50 |
| 3,592,542 | 7/1971 | Kaufer et al. | 355/50 |
| 3,687,545 | 8/1972 | Moorhusen | 355/8 X |
| 3,788,740 | 1/1974 | Shogren | 355/8 X |

Primary Examiner—Fred L. Braun
Attorney, Agent, or Firm—Michael J. Striker

[57] ABSTRACT

Relative movement is effected between the original and the projection system of the copying machine, and the latter projects images of successive transverse strip-shaped sections of the original onto the recording medium. The projection system comprises a plurality of lens-row systems. Each lens-row system includes a first lens row which receives light from a strip-shaped section of the original and projects into an intermediate image plane, and a second lens row which receives light from the intermediate image plane and projects that light onto the recording medium. The lens-row systems are spaced apart in a direction transverse to the direction of elongation of the individual lens rows. The light passing through each lens-row system includes a plurality of central rays, each passing through the optical center of one lens element of the first lens row and through the optical center of the corresponding lens element of the second lens row. Optical deflecting structure is utilized to cause the central rays of the plural lens-row systems to converge both in the vicinity of the original and in the vicinity of the recording medium. Thus, when the plural lens-row systems image onto the recording medium a particular strip-shaped section of the original, this section is being imaged onto the recording medium by all lens-row systems simultaneously, not successively.

9 Claims, 6 Drawing Figures

EXPOSURE SYSTEM FOR COPYING MACHINES

BACKGROUND OF THE INVENTION

The present invention relates to exposure systems for copying machines, of a particular type in which relative movement is effected between the projection system of the exposure system and the original in a predetermined direction, so that the projection system projects images of successive transverse strip-shaped sections of the original onto the recording medium. In the type of system in question, the projection system comprises a plurality of lens-row systems. Each lens row system comprises a first lens row, the lenses of which project light from a strip-shaped section of the original into an intermediate image plane; and a second lens row, the lenses of which receive light from the intermediate plane and project an image of the strip-shaped section onto the recording medium. The individual lens-row systems are spaced apart from one another in the direction transverse to the direction of elongation of the lens rows.

A system of this type, in which the image components projected by the individual lens groups combine to form a whole image, is disclosed in commonly owned U.S. Pat. No. 3,592,542. In order to increase the efficiency of illumination, the image components projected onto the recording medium can be made to directly adjoin or even somewhat overlap, both in direction transverse to the direction of relative movement as well as in the direction of relative movement. U.S. Pat. No. 3,655,284 discloses the use of a plurality of lens-row systems spaced apart in the direction of relative movement between the projection system and the original. Because plural lens-row systems are employed, each point of the recording medium is exposed more than once during travel of the recording medium through the exposure system. This multiple exposing of each point of the recording medium creates the possibility of shorter exposure times and therefore higher operating speed. Also, this multiple exposing inherently tends to equalize out differences which may exist as between the illumination effected by each lens-row system individually. This will in particular be the case when the constituent lens elements of one lens-row system are offset relative to those of the other lens-row system(s) in such a manner that, considered in the aforementioned direction of relative movement, the lens elements of one system fill the spaces between those of an adjoining system.

These advantages of plural lens-row systems are somewhat offset by practical difficulties which they inherently create. A single strip-shaped section of the original is imaged onto a corresponding strip-shaped section of the recording medium not once, but rather once by each lens-row system in turn, at successive times. If the relative movements in question, for example of original and recording medium, are not perfectly uniform and synchronized, but instead for example exhibit a certain amount of oscillation, each single strip-shaped section of the original is imaged plural times onto non-congruent strip-shaped sections of the recording medium. As a result, contours in the image being projected will be reproduced as multiple or ghost contours. Multiple contours are more easily perceived and annoying than even low-contrast or fuzzy contours of the type that can arise with a purely single exposure of comparably long effective duration. Therefore, the use of plural lens-row systems has come to necessitate, as a practical matter, the use of more expensive and fine synchronization of relative movements of originals and recording media, more expensive than would be needed for conventional objectives of the type which project a solid strip-shaped image.

SUMMARY OF THE INVENTION

It is the general object of the invention to be able to utilize plural lens-row systems, in order to achieve the advantages which they provide, but to avoid the problem of multiple non-simultaneous exposure.

According to the broad concept of the invention, this is accomplished by providing in the optical path of the projection system optical deflecting means which cause the central rays of the lens-row systems to converge both in the region of the original and in the region of the recording medium. Preferably, the planes defined by the central rays of each individual lens-row system are caused to intersect in the region of the original and in the region of the recording medium.

With this novel system, each strip-shaped section of the original continues to be imaged by each individual one of the plural lens-row systems, but the imaging of a single strip-shaped section by all the lens-row systems is performed simultaneously. Thus, even if the drives for the original and the recording medium are quite unsmooth in operation, one problem which will not arise is that of the multiple or ghost contours referred to above. At the same time, the advantages of plural lens-row systems continue to be enjoyed, i.e., concentration of light by plural systems upon a single section of the recording medium, and inherent compensation by each lens-row system of the irregularities of the other lens-row system(s).

According to one concept of the invention, the optical deflecting means can be in the form of transparent deflecting prisms. For example, a deflecting prism can be provided at the intermediate image plane and be used to deflect the center rays of all the lens-row systems towards the middle plane of the plural lens-row systems (the middle plane is normal to the direction in which the lens-row systems are spaced apart). Alternatively, two deflecting prisms can be used, one between the plural lens-row systems and the original, the other between the plural lens-row systems and the recording medium, again serving to deflect the center rays of all the lens-row systems towards the aforementioned middle plane.

Instead, however, use can be made of a cylindrical lens provided at the intermediate image plane, its central longitudinal axis lying in the aforementioned middle plane. The cylindrical lens performs the deflecting function in question; additionally, it acts as a field lens, i.e., the provision of a cylindrical lens at this location does not introduce a loss of image quality such as would arise from the use of cylindrical lenses at other locations within the projection system.

According to a further concept, a deflecting mirror is located in the optical path of the plural lens-row systems between the original and the recording medium, the mirror having plural reflecting surfaces of different respective inclinations, such that the individual central-ray planes defined by the central rays of the individual lens-row systems intersect in the region of the original and in the region of the recording medium.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
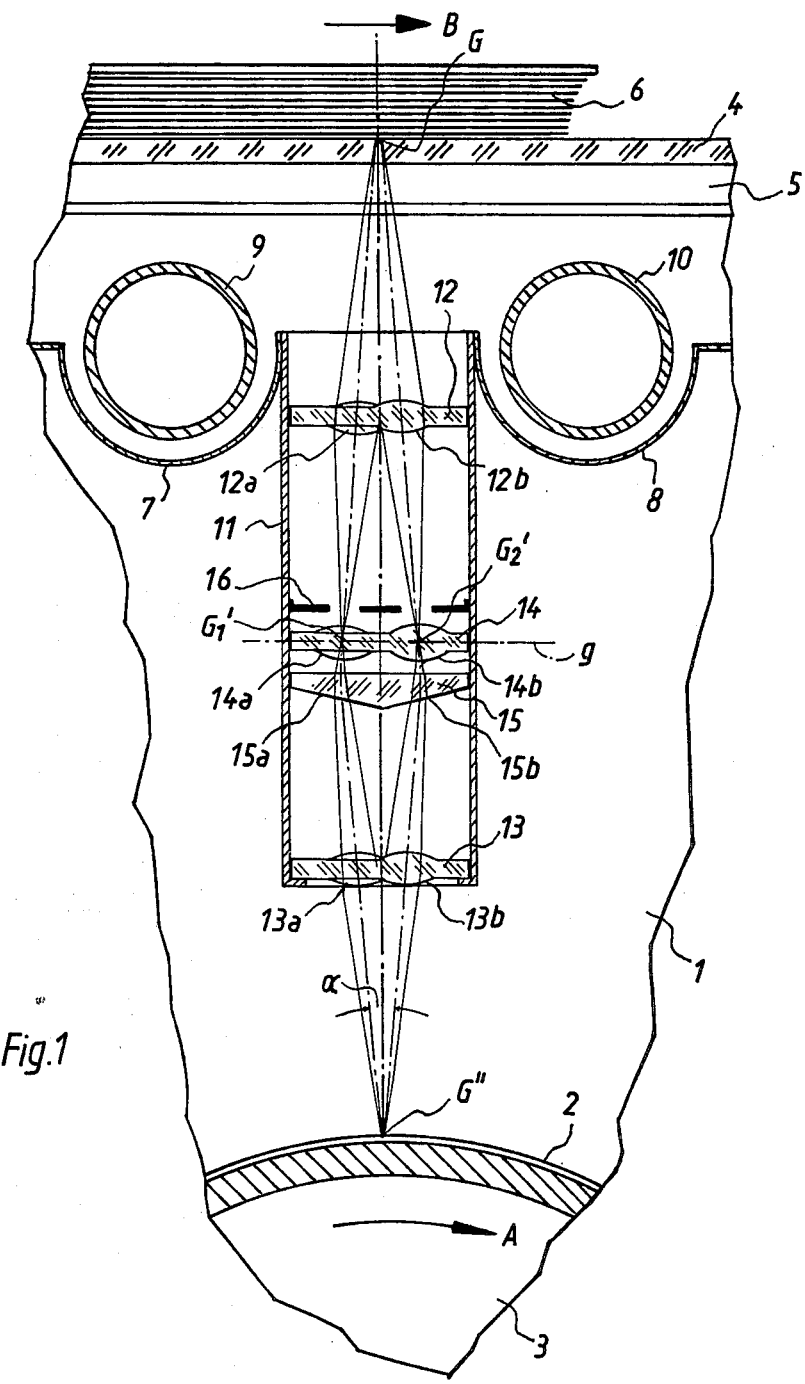
FIG. 1 depicts a first embodiment, in which the deflecting function is performed by a deflecting prism located at the intermediate image plane of the projection system.

In FIG. 1, numeral 1 denotes the housing of a copying machine containing a rotating copying drum 3 whose peripheral surface is provided with a photosensitive layer 2, e.g., photoconductive selenium. The drum 3 rotates in the direction of arrow A during the course of a copying operation. The upper end of the housing 1 is provided with an original carriage 5 mounted for shifting movement in the direction of arrow B. Original carriage 5 includes a transparent support plate 4 for originals 6. In per se conventional manner, the original carriage 4, 5 is shifted in synchronism with the rotation of the copying drum 3, so that the speed of linear movement of the original carriage is identical to the peripheral speed of the copying drum.

Figure 5:
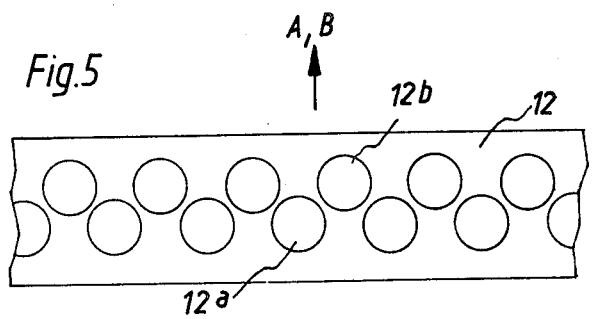
FIG. 5 depicts the organization of individual lenses in a one-piece lens-row bar forming part of two adjoining lens-row systems.

To illuminate the original 6, use is made of two rod-shaped light sources 9, 10 located in respective reflectors 7, 8. Arranged between the reflectors 7 and 8 is a rectangular optics tube 11 containing two lens-row bars 12 and 13 and a field-lens lens-row bar 14. Each lens-row bar 12, 13 and 14 comprises two rows of component lenses. FIG. 5 depicts the lenses 12a of one row and the lenses 12b of the second row of the lens-row bar 12; the lens-row bars 13 and 14 are likewise comprised of two rows of component lenses 13a, 13b and 14a, 14b, respectively. The lenses of one lens row of each lens-row bar are offset relative to those of the other lens row of the bar in such a manner that, when considered in the direction of original and copying drum movement A, B, (see FIG. 5), the lens elements 12b are seen to be located in the interstices between the lens elements 12a. As a result, the surface 2 of the copying drum is exposed to very nearly uniform illumination.

The optics tube 11 additionally mounts a prism 15 having two faces 15a, 15b inclined relative to the base face of the prism. Face 15a is associated with the lens rows 12a, 13a, 14a, whereas face 15b is associated with the lens rows 12b, 13b, 14b. The relative inclinations of the faces 15a, 15b are such that the central principal rays of the a and b lens-row systems are deflected in the vicinity of the intermediate image plane g such that their planes intersect at a transverse line G on the upper surface of the transparent support plate 4 carrying the originals, and also at a transverse line G'' located on the surface of the photosensitive layer 2 of the copying drum. In the intermediate focal plane g itself, these central principal rays pass through respective focal lines $G_1'$ and $G_2'$. It will be understood that the a and b lens rows on the lens-row bars 12 and 13 must of course be so arranged that their optical centers lie on these central principal ray paths.

With this system, the focussed projection upon and illumination of each G'' image point by the a and b lens-row systems is performed simultaneously by the two systems. Thus, if the drive and transmission utilized for shifting the original carriage 4, 5 and for rotating the copying drum 3 synchronously therewith exhibit, for example, even considerable vibration, this will not lead to multiple projection of individual G points of the original onto the photosensitive layer 2. At the same time, each G'' image point receives light from two (or more) lens-row systems (here the a and b systems), making for an accumulation of light from plural systems. Furthermore, the offset between the component lenses of the plural lens-row systems makes for a particularly effective equalization of the exposure light in the direction transverse to drum and original movement. In particular, the transitions at image field edges of the individual lens-row systems are made much less noticeable than if one used only a single lens-row system; with a single lens-row system, it would be necessary to use very precisely positioned field stops for the component lenses of the lens row systems to achieve a comparable final effect. With the illustrated plural lens-row systems exact relative positioning of field stops and individual component lenses of the lens-rows becomes less and less critical, as the number of adjoining lens-row systems employed is made greater and greater.

If use is made of more than two lens-row systems, then the prism 15 must have, instead of the two prism faces 15a and 15b, a number of prism faces corresponding to the number of lens-row systems involved, and the inclination of the individual prism exit faces must be selected such that the central principal rays of the plural systems make the G and G'' intersections described above.

The introduction of the deflecting prism 15 changes the angle of incidence of the light rays incident upon the photosensitive layer 2; this is indicated by the angle alpha for the central principal rays discussed above, this being the angle of incidence relative to a normal to the surface of layer 2. To keep within acceptable limits the degree to which this change of incidence angle might detract from image sharpness, an intermediate-image field stop plate 16 is provided in the vicinity of the intermediate image plane g. Additionally, the intermediate-image field stop plate 16 serves to hold the deviation between the image field of the component lenses (which is planar or exhibits curvature about the optical centers of these elements) and the surface (here cylindrical) of the recording medium within the limits of the depth of focus range of the projection system, and also serves to prevent spillover of light as between neighboring lens-row systems.

Figure 2:
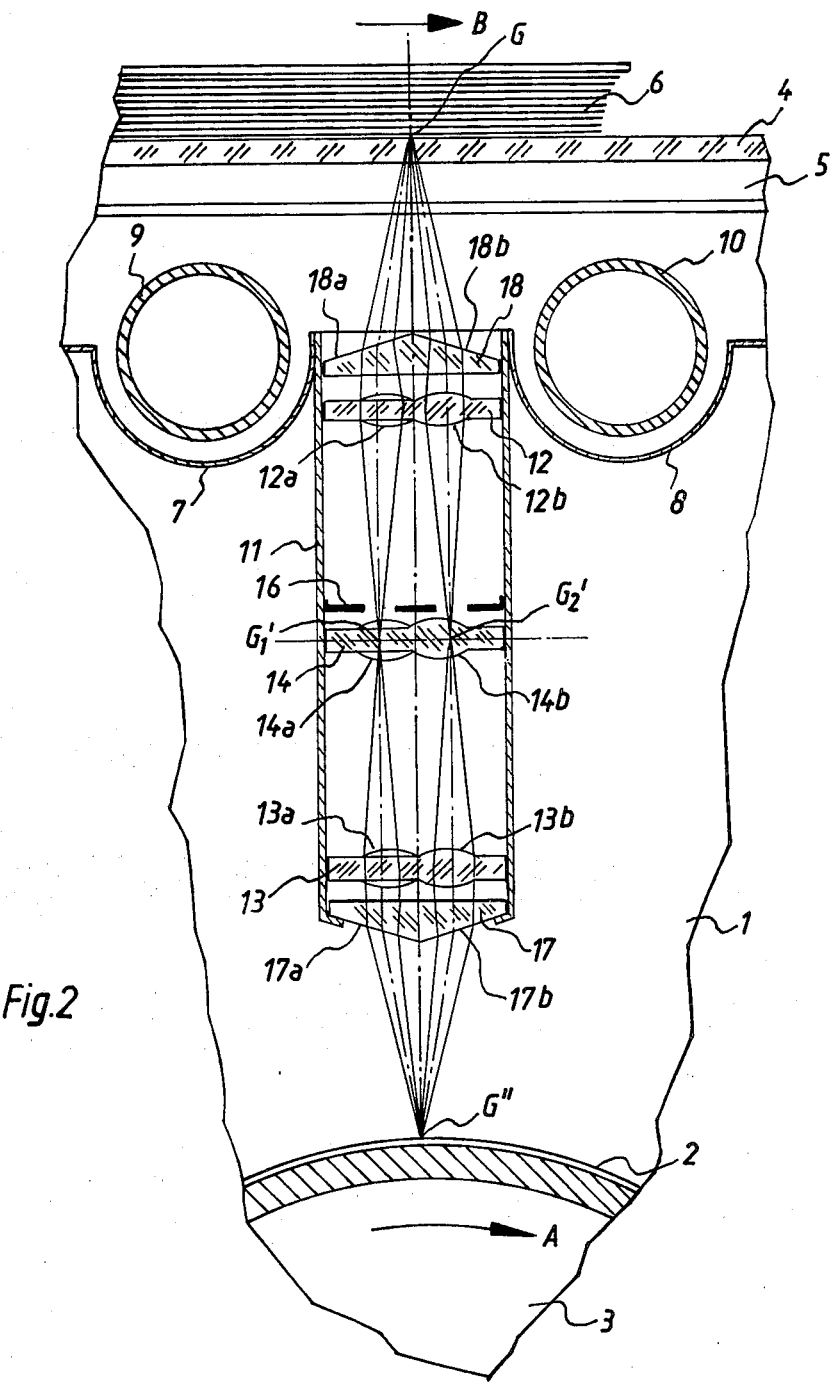
FIG. 2 depicts a second embodiment, utilizing two deflecting prisms, located between the plural lens-row systems and the original and recording medium, respectively.

The embodiment of FIG. 2 differs from that of FIG. 1, in that use is here made of two deflecting prisms 17, 18 having prism faces 17a, 17b, 18a, 18b for cooperation with the a and b lens-row systems. Prism 17 is located between the exit lens-row bar 13 and the copy image plane; prism 18 is located between the entrance lens-row bar 12 and the plane of an original to be copied. The two prisms 17, 18 are arranged symmetrically within the entire projection system. The arrangement of lens-row bars in FIG. 2 is otherwise the same as in FIG. 1.

Figure 3:
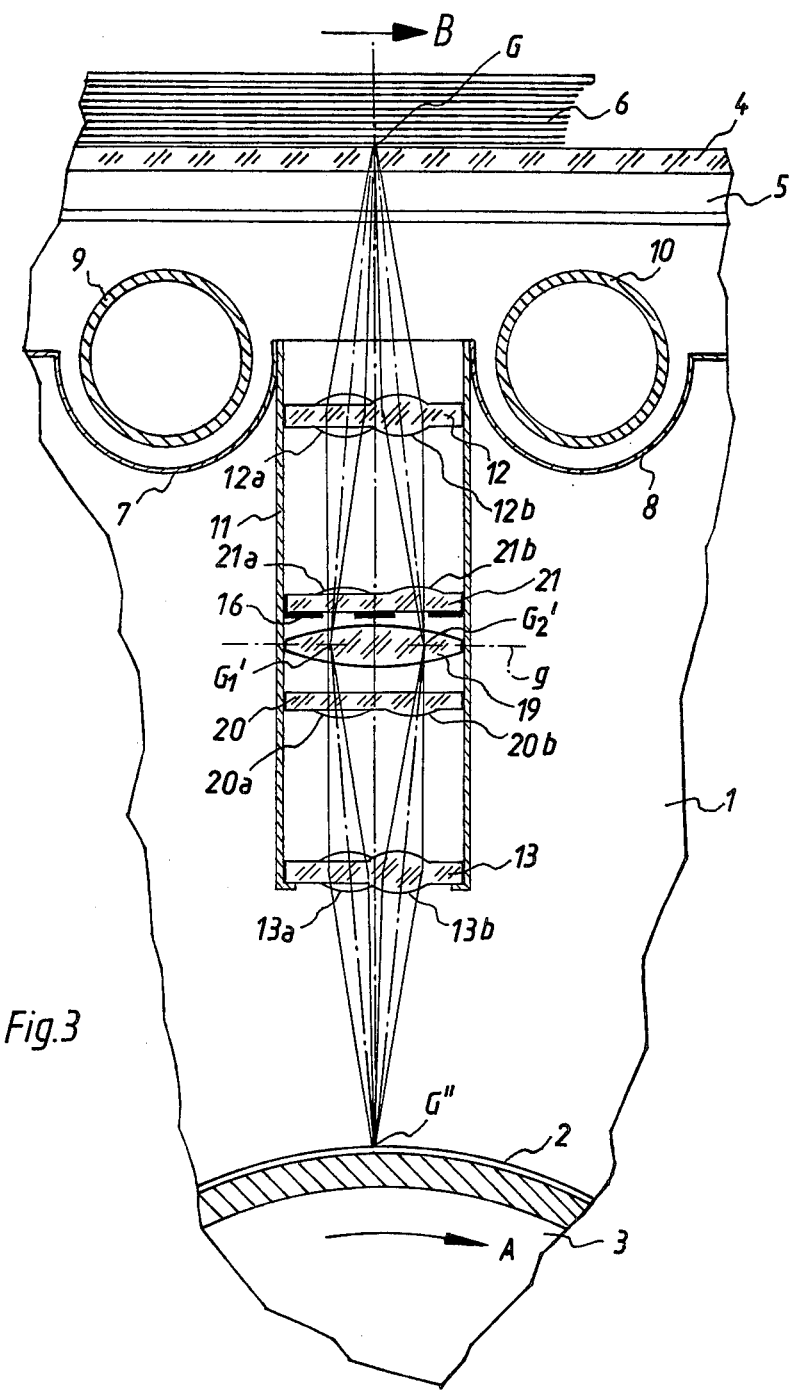
FIG. 3 depicts a third embodiment, utilizing a cylindrical lens located at the intermediate image plane for performing the deflecting function.

In the embodiment of FIG. 3, the intermediate image plane g is occupied by a cylindrical lens 19. The two lens-row bars 12 and 13 project into the intermediate image plane g with unity magnification 1:1. The cylindrical lens 19 located in the intermediate image plane g has a focal length equal to one-fourth the distance between the original plane and the recording medium, and accordingly projects the central principal rays of the lens-row systems emerging from the G line on the original onto the G" line on the recording medium. The presence of the cylindrical lens 19 does not disturb the accurate projection of the G points into the G" points; because the lens 19 is located in the intermediate image plane g, its optical action is limited to that of a mere field lens, i.e., in addition to its deflecting role.

Despite the presence of the cylindrical lens 19 in the intermediate image plane g, it is still possible to furthermore provide field-lens lens-row bars 20 and 21 in the vicinity of the intermediate image plane g. The total focal length of these field-lens lens-row bars 20, 21 is equal to approximately one-fourth the distance between the two lens-row bars 12, 13; accordingly, the field-lens lens-row bars 20, 21 serve to project the lens elements 12a and 12b into the lens elements 13a and 13b. Such spherical field lenses introduce negligible distortion into the actual image formed on the recording medium, despite their location not exactly in the intermediate image plane g. The introduction of these field-lens lens bars 20, 21 does of course somewhat alter the total focal length of the projection system and shift the locations of the component images; therefore, if one wishes to incorporate these field-lens lens bars, this effect will typically be taken into account when selecting the focal lengths of the lens-row bars 12, 13 and the spacing of the individual lens elements thereof, which is easily done. Besides, shifting of the image will anyway not be noticeable if, as shown in FIG. 3, the two field-lens lens-row bars are of the same construction and located symmetrically with respect to the intermediate image plane g.

Figure 4:
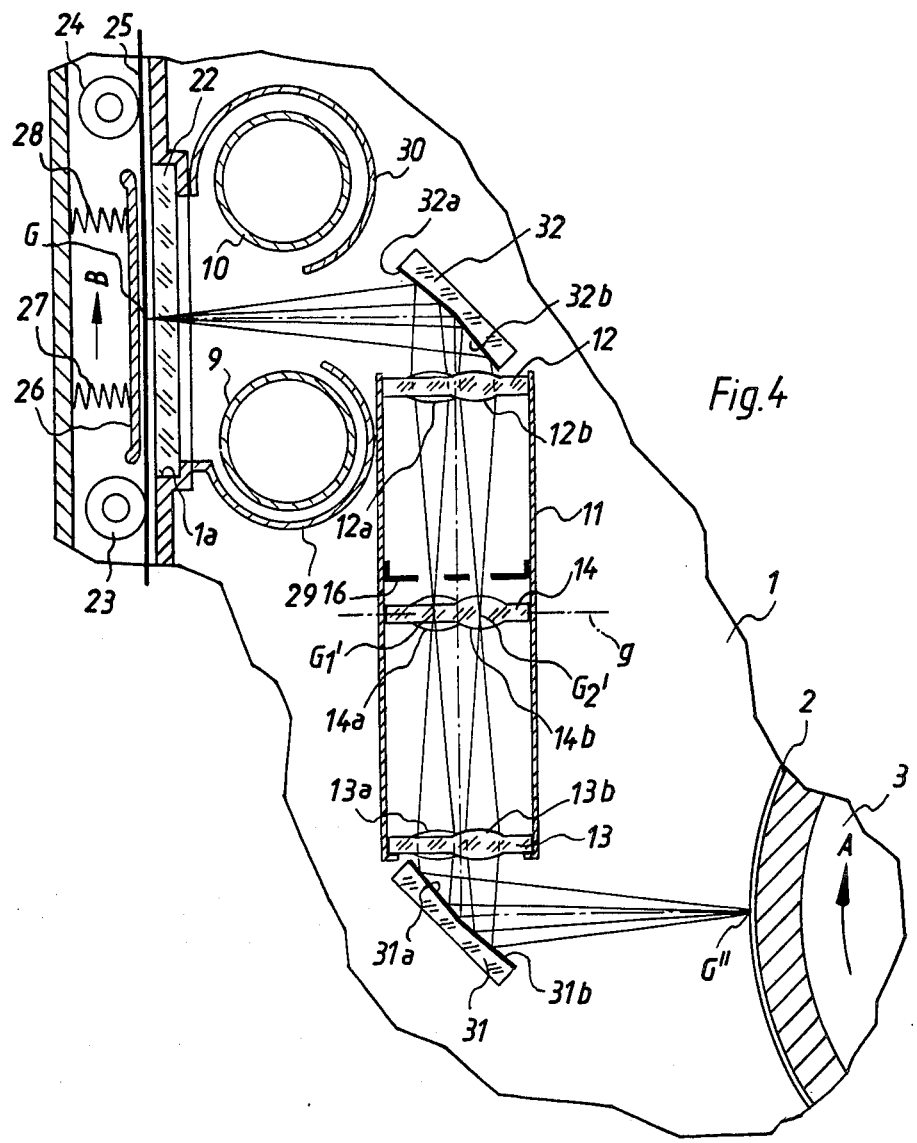
FIG. 4 depicts a fourth embodiment utilizing two deflecting mirrors.

In the embodiment of FIG. 4, the housing 1 of the copying machine has an opening 1a, in which is inserted a transparent support plate 22 for originals. Transport rollers 23, 24 transport a sheet original 25 in the direction of arrow B. Again, by means for example of an interconnecting transmission, the transport speed of the original is equal to the peripheral surface speed of the copying drum 3. During its transport past the plate 22, an original 25 is pressed thereagainst by a pressing plate 26, urged by compression springs 27, 28. The illumination of the originals is performed by elongated light sources 9, 10 accommodated within reflectors 29, 30. The projection of an image of the original 25 onto the surface 2 of the drum 3 is again effected using a rectangular optics tube 11 mounting lens-row bars 12 and 13, a field-lens lens-row bar 14 and an intermediate-image-plane field stop plate 16.

Deflecting mirrors 31 and 32 are provided down-path and up-path of the optics tube 11, respectively. Each deflecting mirror 31 and 32 is provided with two oppositely inclined reflective surfaces 31a, 31b and 32a, 32b, respectively. The relative inclinations of each pair of reflecting surfaces are such that the central principal rays of the a and b lens-row systems passing through the optical centers $G_1'$ and $G_2'$ of the a and b lens-rows of the field-lens lens-row bar 14 intersect at points G on the original and points G" on the recording medium.

Figure 6:
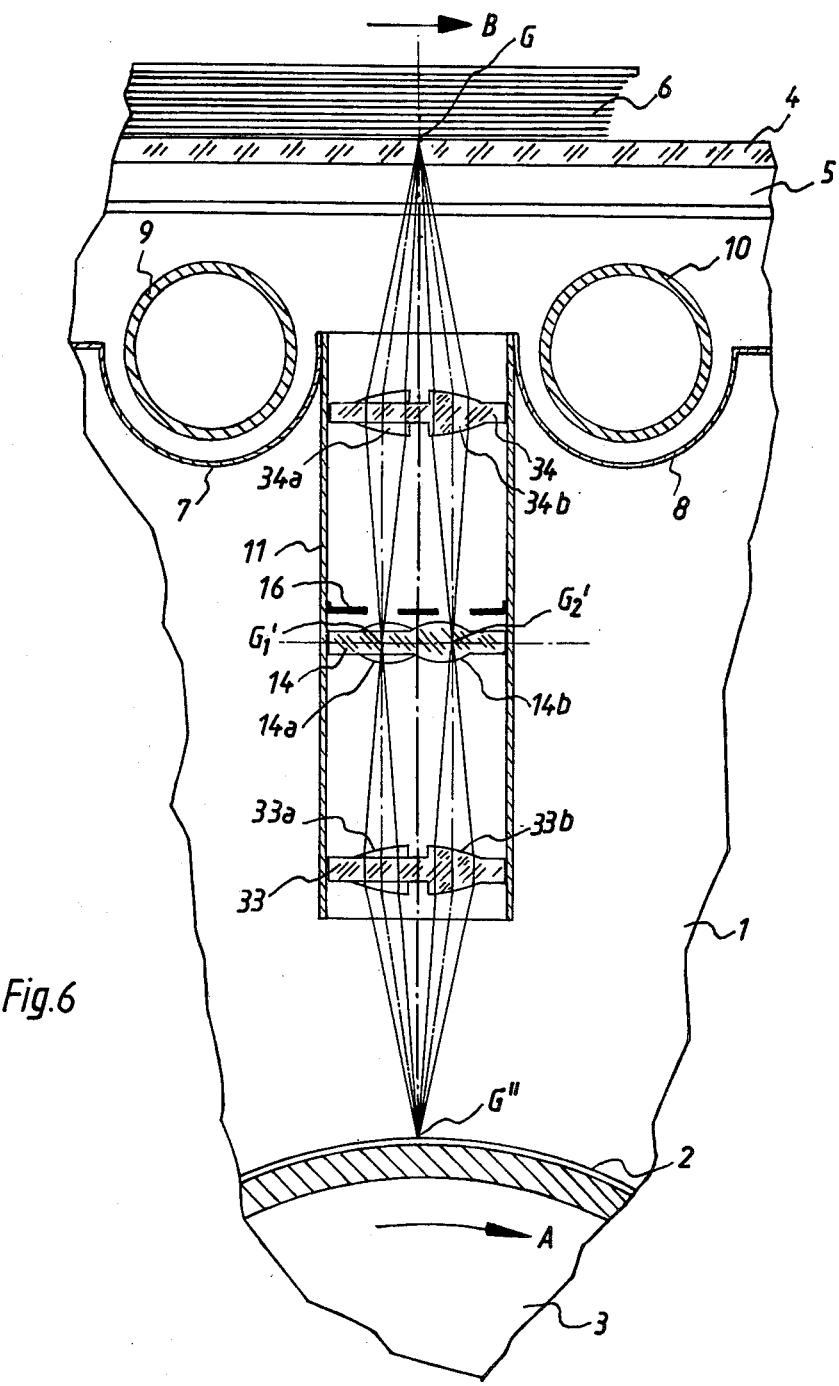
FIG. 6 depicts a fifth embodiment, utilizing lens-row bars the lens elements of which are wedge-shaped and have spherical surfaces.

In the embodiment of FIG. 6, the plane formed by the central principal rays of the a and b lens-row systems are again made to intersect at the G and G" lines. Here, this is achieved using lens-row bars 33, 34 the individual component lenses of which are decentered spherical lens elements or wedge-like lens elements 33a, 33b and 34a, 34b having spherical surfaces. The field-lens lens-row bar 14 is constituted by normal, i.e., centered sperical lens elements, as in for example FIG. 2.

Alternatively, the cylindrical lens 19 and spherical field-lens lens-row bars 20 and 21 of FIG. 3 could all be omitted and replaced by a lens-row bar such as the bars 33, 34 of FIG. 6, i.e., a field-lens lens-row bar the constituent lens elements of which are wedge-like and have spherical surfaces.

It will be understood that each of the elements described above, or two or more together, may also find a useful application in other types of constructions differing from the types described above.

While the invention has been illustrated and described as embodied in a projection system for a particular type of copying machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an exposure arrangement for copying machines, the exposure arrangement being of the type including an optical projection system and means for effecting relative movement between the projection system and an original to be copied in a predetermined direction to project onto a recording medium images of successive transverse strip-shaped sections of the original, the projection system comprising a plurality of lens-row systems, each lens-row system comprising a first row of lens elements operative for receiving light from a strip-shaped section of the original and projecting the received light into an intermediate image plane, each lens-row system comprising a second row of lens elements cooperating with the elements of the respective first row and operative for receiving light from the intermediate plane and projecting the received light onto the recording medium, the lens-row systems being spaced apart in a direction transverse to the direction of elongation of the individual rows of lenses, the light passing through each lens-row system including a plurality of central rays, each central ray being a ray passing through the optical center of one lens element of the first row of the lens-row system and also passing through the optical center of the corresponding lens element of the second row of the lens-row system, the improvement comprising the provision of optical deflecting means located in the light path of the projection system and operative for causing the central rays of the lens-row systems to converge both in the vicinity of the original and in the vicinity of the recording medium.

2. In a exposure arrangement as defined in claim 1, the central rays of each individual lens-row system defining a central-ray plane in the vicinity of the original and in the vicinity of the recording medium, the optical deflecting means being operative for causing the central-ray planes to intersect at the surface of the original and at the surface of the recording medium.

3. In an exposure arrangement as defined in claim 1, the optical deflecting means comprising a plurality of transparent deflecting prisms.

4. In an exposure arrangement as defined in claim 1, the plurality of lens-row systems having a middle plane which is normal to the direction in which the lens-row systems are spaced apart, the optical deflecting means comprising a transparent deflecting prism located in the region of the intermediate image plane and operative for deflecting the central rays of all the lens-row systems in direction towards the middle plane.

5. In an exposure arrangement as defined in claim 1, the plurality of lens-row systems having a middle plane which is normal to the direction in which the lens-row systems are spaced apart, the optical deflecting means comprising two deflecting prisms, one prism located between the first rows of lenses and the original, the other prism located between the second rows of lenses and the recording medium, each deflecting prism being operative for deflecting the central rays of all the lens-row systems in direction towards the middle plane.

6. In an exposure arrangement as defined in claim 1, the plurality of lens-row systems having a middle plane which is normal to the direction in which the lens-row systems are spaced apart, the optical deflecting means comprising a cylindrical lens located at the intermediate image plane and having a central longitudinal axis lying in the middle plane and operative for deflecting the central rays of all the lens-row systems in direction towards the middle plane.

7. In an exposure arrangement as defined in claim 2, the optical deflecting means comprising a deflecting mirror, the mirror being located in the optical path of the lens-row systems between the original and the recording medium, the deflecting mirror having plural deflecting surfaces of different respective inclinations operative for causing the central-ray planes to intersect.

8. In an exposure arrangement as defined in claim 1, the optical deflecting means comprising a lens-row bar constituted by at least one row of wedge-shaped lens elements having spherical lens surfaces.

9. In an exposure arrangement as defined in claim 1, at least one of the rows of lenses of the lens-row systems being a lens-row bar comprising at least one row of wedge-shaped lens elements having spherical surfaces and itself constituting at least part of the optical deflecting means.

* * * * *